July 10, 1962 R. B. WALDRON 3,043,120
SPEEDOMETER CABLE
Filed Nov. 23, 1959
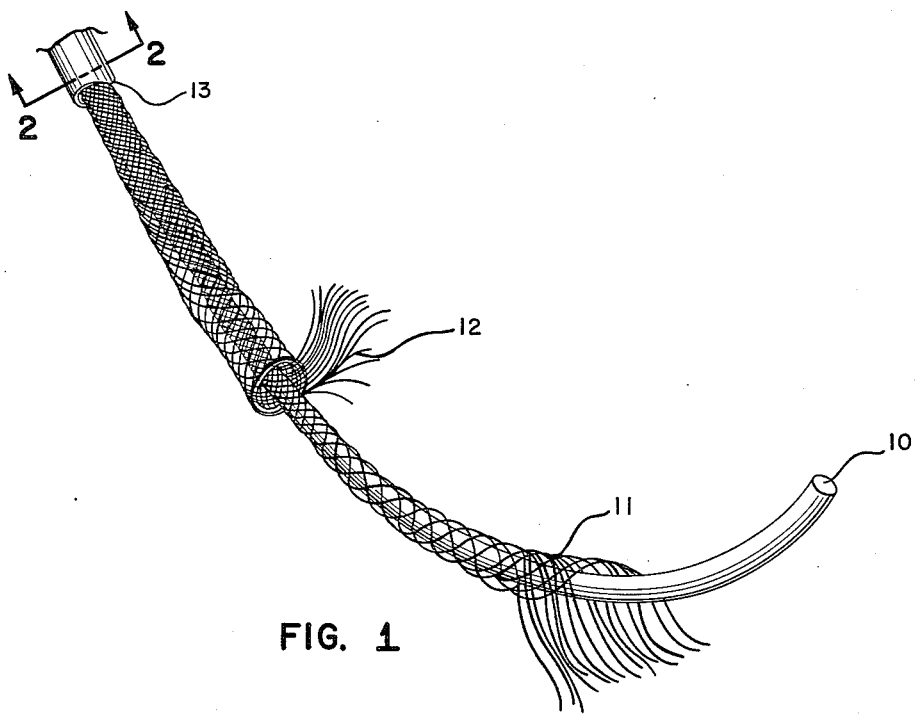
FIG. 1
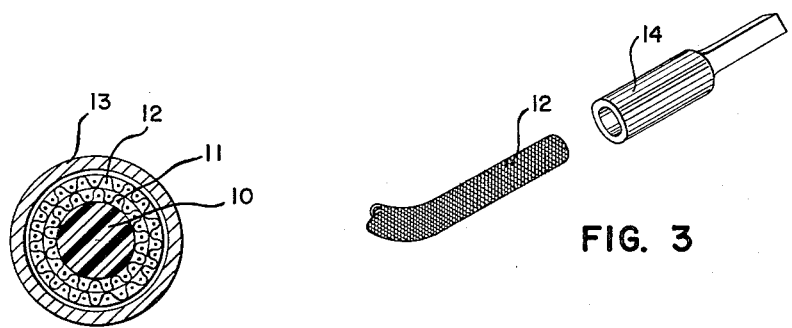
FIG. 2
FIG. 3
RALPH B. WALDRON
INVENTOR.
BY John R. Faulkner
T. H. Oster
ATTORNEYS

SPEEDOMETER CABLE

Ralph B. Waldron, New Baltimore, Mich., assignor to Ford Motor Company, Dearborn, Mich., a corporation of Delaware
Filed Nov. 23, 1959, Ser. No. 854,657
4 Claims. (Cl. 64—2)

This invention relates to a speedometer cable whose function is to transmit rotary motion from an appropriate portion of the power train of a vehicle to the speedometer itself. These speedometer cables must be able to transmit moderate torques along a sinuous path and should produce a motion at the output end which is an instantaneous faithful reproduction of the input motion. Windup which results in fluctuations of the speedometer needle should be substantially absent.

To obtain a large measure of these desiderata this invention has been perfected and may best be understood by a study of the attached drawing in which:

FIGURE 1 is a perspective view of a speedometer cable partially disassembled for clarity of illustration, and FIGURE 2 is a cross section of the structure shown in FIGURE 1 taken on the line 2—2, and FIGURE 3 is a view of a finished structure shown in FIGURE 1 preparatory to adding the connector for transmitting motion to and from the structure shown in FIGURES 1 and 2.

The torque transmitting members of this invention are fabricated from self-lubricating plastic materials which are currently available on the market under designations such as nylon, Teflon and Dacron, although the invention is by no means limited to these particular materials but may employ any material having like properties. Nylon, Teflon and Dacron are defined as follows in Condensed Chemical Dictionary, 5th edition, Rheinhold Publishing Company, 1956:

Dacron—Trademark for a synthetic polyester fiber made from methyl terephthalate and ethylene glycol. Available as continuous filament yarn, stapel, tow, and fiber-fill, p. 337.

Nylon—This word is a generic term for any long chain polymeric amide which has recurring amide groups as an integral part of the main polymer chain, and which is capable of being formed into a filament in which the structural elements are oriented in the direction of the axis. The term "nylon" does not refer to a particular product but rather to a family of chemically related products, which may be fabricated and used in many different physical forms, p. 794.

Teflon—Trademark for tetrafluoroethylene resins. These are available in the forms of aqueous dispersions; finishes; extrusion powder; molding powder; wire enamels, p. 1057.

The preferred form of plastic speedometer cable comprises a central self-lubricating plastic rod 10 surrounded by a pair of braided concentric sheaths of self-lubricating plastic filaments 11 and 12 as shown in FIGURES 1 and 2. For the usual installation, the braided sheaths will be protected by a stationary protecting tube 13 which is capable of limited bending. Any conventional tube either plastic or metal may be employed at this location.

The plastic self-lubricating rod and concentric sheaths which actually transmit the motion terminate in a connector 14 as shown in FIGURE 3. Connector 14 serves to transmit motion to and from the plastic self-lubricating rotating members 10, 11 and 12 and the driving and driven portions of the speedometer system.

By way of examples, the following cables have been built to illustrate the invention.

I.

(a) Extrude a nylon rod at .065" diameter.
(b) Braid .008" diameter monofilaments of nylon over the extruded rod. Diameter of the assembly at this point .098".
(c) Braid a second jacket .008" diameter nylon monofilaments over the assembly bringing the total diameter to .125".

II.

(a) Extrude a nylon rod at .040" diameter.
(b) Braid .015" diameter monofilaments of nylon over the extruded rod. Diameter of the assembly at this point should be .082".
(c) Braid a second jacket over the assembly using .015" diameter monofilaments. Diameter of the assembly should be .125".
(d) Braid a third jacket of the assembly using .002" diameter monofilaments. Total diameter of assembly should be .130".

III.

(a) Extrude a rod of nylon at .077" diameter.
(b) Braid .008" diameter monofilaments of nylon over the extruded rod. Diameter of the assembly at this point should be .111".
(c) Braid a second nylon jacket over the assembly using .008" diameter monofilaments. Diameter of assembly is now .142".

Braiding of jackets is done using 16 strands of monofilament, 8 in each direction.

IV.

(a) Extrude a nylon rod at .065" diameter.
(b) Braid .008" diameter monofilaments of nylon over the extruded rod. Biameter of the assembly should be .098" at this point.
(c) Braid a second jacket over the assembly using .004" diameter monofilaments. Diameter of assembly at this point should be .117".
(d) Braid a third jacket over the assembly using .004" diameter monofilaments. Total diameter of the assembly should be .127".

V.

(a) Extrude nylon rod of .065" diameter.
(b) Cool extruded rod before coiling in order to minimize residual curvature or set. Coil into large diameter reels.
(c) Braid a jacket over the extruded core. Braided jacket to be made up of .0081" diameter monofilaments. Diameter .098".
(d) Braid a second jacket over the first using .0081" diameter monofilament. Diameter .117".
(e) Braid a third outer jacket onto the construction bringing the total diameter to .127" total.

VI.

(a) Extrude a nylon rod at .040" diameter.
(b) Braid .015" diameter monofilaments of nylon over the extruded rod. Diameter of the assembly at this point should be .082".
(c) Braid a second jacket over the assembly using .015" diameter monofilaments. Total diameter of the assembly should be .125".

VII.

(a) Extrude a nylon rod at .040" diameter.
(b) Braid .020" diameter monofilaments of nylon over the extruded rod. Diameter at this point should be .090".
(c) Braid a second jacket over the assembly using .008" diameter monofilaments. Diameter of assembly at this point should be .115".

(d) Braid a third jacket over the assembly using .004" diameter monofilaments. Total diameter of the assembly should be .125".

I claim:

1. A speedometer cable comprising a central self-lubricating plastic rod enclosed in at least one braided sheath of self-lubricating plastic filaments and terminating at each end in a connector for transmitting motion to and from the plastic self-lubricating members.

2. A speedometer cable comprising a central self-lubricating plastic rod enclosed in a pair of concentric braided sheaths of self-lubricating plastic filaments and terminating at each end in a connector for transmitting motion to and from the plastic self-lubricating members.

3. A speedometer cable comprising a central self-lubricating plastic rod enclosed in at least one braided sheath of self-lubricating plastic filaments and terminating at each end in a connector for transmitting motion to and from the plastic self-lubricating members, said plastic self-lubricating members being enclosed in a stationary protecting tube, and rotatable therein.

4. A speedometer cable comprising a central self-lubricating plastic rod enclosed in a pair of concentric braided sheaths of self-lubricating plastic filaments and terminating at each end in a connector for transmitting motion to and from the plastic self-lubrication member, said plastic self-lubricating members being enclosed in a stationary protecting tube, and rotatable therein.

References Cited in the file of this patent

UNITED STATES PATENTS

| | | |
|---|---|---|
| 261,534 | Cortis | July 25, 1882 |
| 2,012,842 | Whitted | Aug. 27, 1935 |
| 2,821,092 | Cordora et al. | Jan. 28, 1958 |
| 2,884,771 | Holt | May 5, 1959 |